3,654,146
AEROBIC REMOVAL OF PHOSPHATE FROM ACTIVATED SLUDGE

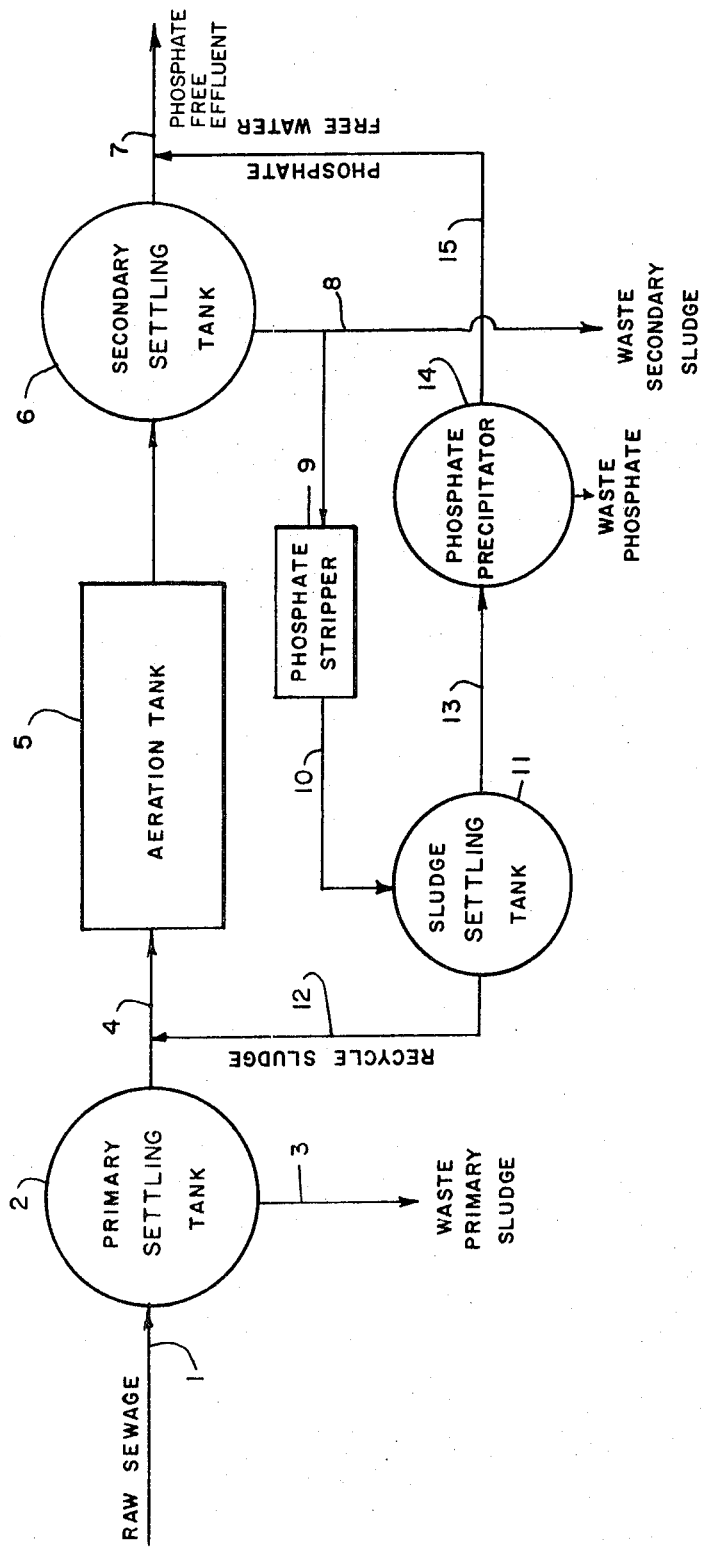

Gilbert V. Levin, Chevy Chase, Md., and George J. Topol, Reston, Va., assignors to Biospherics Incorporated, Rockville, Md.
Filed Feb. 3, 1971, Ser. No. 112,179
Int. Cl. C02c 1/06
U.S. Cl. 210—6  4 Claims

ABSTRACT OF THE DISCLOSURE

There is disclosed an activated sludge sewage treatment process in which phosphates are removed from phosphate-enriched sludge by aerating the phosphate-enriched sludge with an oxygen-containing gas. During aeration, the organisms in the sludge, after consuming the available food substrate, go into endogenous respiration, consuming much of their own cellular material. Thus, the aeration serves to reduce the volume of sludge as well as to cause the organisms in the sludge to release phosphate. A phosphate-enriched supernatant liquor is formed on settling. The sludge, having a reduced phosphate content, is separated from the phosphate-enriched supernatant liquor and at least a portion thereof is recycled for mixing with influent sewage material in an activated sludge sewage treatment process. The resultant mixed liquor is aerated to reduce the BOD content and to cause the organisms present to take up phosphate and phosphate-enriched sludge is separated from the mixed liquor to provide a substantially phosphate-free effluent.

---

This invention relates to a process for treating raw or treated sewage to obtain a substantially phosphorous-free effluent which is returned to natural water resources.

In the conventional activated sludge system in use today, sewage is subjected to the usual screening and preliminary sedimentation procedures, then mixed with activated sludge recycled from a settling tank to form a mixed liquor and the mixed liquor is subjected to aeration. During aeration of the mixed liquor, the organisms present cause the aerobic decomposition of solids and a high degree of BOD removal is achieved.

Phosphates, which are present in organic wastes and detergents, escape conventional sewage treatment processes and are released with the effluent into natural water resources, e.g., lakes, rivers and streams. These phosphates result in over fertilization or eutrophication of waters causing unsightly algal blooms and serious pollution problems.

It is known that aeration of the mixed liquor in an acticated sludge sewage treatment process initially causes the microorganisms present to take up phosphate and that extended aeration results in the release of phosphates taken up by the sludge microorganisms in the early period of aeration. Thus, it has been reported that maximum phosphate uptake occurs by approximately the sixth hour of aeration and that after 8 hours of aeration, phosphate is released by the microorganisms, with essentially complete release of the phosphate taken up occurring after continued aeration.

U.S. Pat. No. 3,236,766 discloses a process for removing phosphates from sewage. According to the process disclosed in that patent, the pH of raw sewage is adjusted, if necessary, to maintain a range of from about 6.2 to about 8.5, the sewage is mixed with activated sludge to form a mixed liquor, the mixed liquor is aerated to maintain a dissolved oxygen content of at least 0.3 mg. per liter in the mixed liquor and a phosphate-enriched sludge is separated from the mixed liquor to provide a substantially phosphate-free effluent. The phosphate-enriched sludge is treated to reduce the phosphate content thereof prior to recycling for mixing with the influent sewage. This is accomplished by maintaining the phosphate-enriched sludge in an anaerobic condition or at a pH of less than 6.5 for about 10 to 25 minutes. The anaerobic condition and the acidic pH induce considerable quantities of intracellular phosphate to leak out of the sludge into a liquid phase.

Several other processes have since been proposed for reducing the phosphate content of phosphate-enriched sludge following the aeration step in an activated sludge sewage treatment process. Thus, U.S. Pats. Nos. 3,385,785 and 3,390,077 disclose adjusting the pH of phosphate-enriched sludge to between about 3.5 and 6.0 and agitating the sludge in contact with a low phosphate-containing aqueous medium for a time sufficient to effect transfer of water-soluble phosphate material from the sludge to the aqueous phase. The phosphate-enriched aqueous medium is separated from the phosphate-depleted sludge and the phosphate-depleted sludge is recycled to form the mixed liquor.

U.S. Pat. No. 3,522,171 also discloses a method of treating sludge to reduce the phosphate content prior to recycling as seed material in the aeration zone of an activated sludge sewage treatment system. The method disclosed in this patent involves subjecting a first sludge concentrate produced in the separator successively to acidification followed by separation of a second sludge concentrate. This concentrate is diluted with a low phosphate content aqueous medium and a third sludge concentrate is separated which is the reduced phosphate content concentrate of microorganisms to be recycled.

It is an object of this invention to provide a process for reducing the phosphate content of phosphate-enriched sludge and for promoting a high degree of BOD removal in an activated sludge sewage treatment process.

It is another object of this invention to provide such a process which reduces the volume of the sludge at the same time the phosphate content is being reduced, thus resulting in little waste sludge which must be disposed of.

These and other objects are attained by the practice of this invention which, briefly, comprises treating phosphate-enriched sludge which has been separated from aerated mixed liquor in an activated sludge sewage treatment process by aerating the phosphate-enriched sludge with an oxygen-containing gas. During aeration, the organisms in the sludge consume the available food substrate and then go into endogenous respiration, in which they consume their own cellular material. The organisms also release the phosphate taken up during the aerobic treatment of the mixed liquor. There results a phosphate-enriched supernatant liquor and a phosphate-depleted sludge on settling. This sludge is then separated from the phosphate-enriched supernatant liquor and is recycled for mixing with influent sewage material in the activated sludge sewage treatment process. The resultant mixed liquor is aerated to reduce the BOD content and to cause the organisms present to take up phosphate and phosphate-enriched sludge is separated from the mixed liquor to provide a substantially phosphate-free effluent. Thus, it has now been discovered that the anaerobic treatment of phosphate-enriched sludge to reduce the phosphate content thereof disclosed in U.S. Pat. No. 3,236,766 may be replaced by an aerobic treatment.

The invention is illustrated in the accompanying drawing wherein the figure is a flow diagram of the phosphate removal process of this invention.

A raw sewage influent stream 1 is passed through conventional screening and grit removing units and is optionally subjected to primary settling in a tank 2 from which primary sludge is removed in line 3. The primary settled sewage is mixed with recycled, activated sludge hereinafter described to form a mixed liquor and is passed by line 4 to the aeration tank 5. In the aeration tank, the mixed liquor is aerated at a rate sufficient to maintain at least about 0.3 mg. of dissolved oxygen per liter of mixed liquor for a period of at least 10 minutes. During areation, the bacteria present take up phosphate and consume organic matter present in the sewage. A high degree of BOD removal is obtained during aeration.

After aeration, the mixed liquor is fed into a secondary settling tank 6. In the secondary settling tank 6, phosphate-enriched sludge settles and thereby separates from the liquor. The sludge contains a substantial portion of the phosphate present in the sewage. The substantially phosphate-free effluent is discharged for disposal in a conventional manner by line 7.

The phosphate-enriched sludge is removed from the settling tank 6 by line 8. A portion of the sludge may be delivered to waste and the remainder is passed to the phosphate stripper 9. In the phosphate stripper 9, the phosphate-enriched sludge is aerated, preferably at a rate of from 2 to 20 cubic feet of air per gallon of sludge for from 3 to 24 hours. This causes the organisms in the sludge to release the phosphate which they have taken up in the aeration tank 5. The phosphate leaks out of the sludge into a liquid phase. The aeration also causes the organisms to undergo endogenous respiration thereby consuming much of their own cellular material. This results in a reduction of the amount of sludge which must be handled and subsequently disposed of. The aeration should be controlled to insure that it does not reduce the amount of viable sludge below the amount which is required for recycle to form the mixed liquor. The amount of sludge required for recycle depends on the strength of the sewage, the phosphate content of the sewage and the amount of viable organisms in the sludge. If aeration is carried out for too long, there are not sufficient viable organisms left in the recycle sludge to effectively consume the available nutrients and to take up the phosphates from the sewage. The sludge having a reduced phosphate content is separated from the liquid phase by passing the aerated mixture from the phosphate stripper 9 by line 10 to the settling tank 11. After settling, the sludge is withdrawn from the settling tank 11 and passed by line 12 for mixing with the raw sewage which is being fed to the aeration tank 5.

A phosphate-enriched liquid phase is produced in the phosphate stripper 9. This liquid phase is withdrawn as a supernatant liquor from the settling tank 11 and is passed by line 13 to the phosphate precipitator 14. A phosphate precipitant, such as lime, is mixed with the phosphate-enriched supernatant liquor in the phosphate precipitator 14 to precipitate phosphate. The phosphate precipitate may be combined with any waste phosphate-enriched sludge removed from the secondary settling tank 6 and converted into a fertilizer or otherwise disposed of by conventional methods. A phosphate-free supernatant liquor is withdrawn from the phosphate precipitator 14 and passed by line 15 to line 7 wherein it is combined with the phosphate-free effluent from the secondary settling tank 6.

The process of this invention not only reduces the phosphate content of the phosphate-enriched sludge, but it also reduces the amount of waste sludge which must be disposed of to less than 50% of the amount which would be produced in a conventional activated sludge sewage treatment process.

The following example illustrates a specific embodiment of this invention:

EXAMPLE

The pH of influent raw sewage is adjusted to 7–8 and is passed through conventional screening and grit removal units. The raw sewage is mixed with recycled activated sludge having a low phosphate content in an amount sufficient to provide about 15% by volume of return sludge in the mixed liquor. The mixed liquor is then fed at the rate of 15 gallons per hour to an aeration zone and it is areated at a rate of 2 cubic feet of air per gallon of sewage for 6 hours. The effluent mixed liquor from the areation zone is fed to a secondary settling tank. Clarified waste liquid which is substantially free of phosphate is discharged to the effluent outflow after chlorination. The phosphate-enriched sludge is passed to a phosphate stripper wherein it is aerated at a rate of about 4 cubic feet of air per gallon of sludge, the aeration period being for about 12 hours. The areated mixture is passed to a settling tank and, after settling, the phosphate-depleted sludge is recycled for mixing with incoming raw sewage. The phosphate-enriched supernatant liquid is withdrawn from the settling tank and is fed into a chemical precipitation tank where lime is added and mixed to form a phosphate precipitate. The phosphate precipitate is wasted and the phosphate-depleted effluent is discharged to the effluent outflow along with the clarified waste liquid from the secondary settling tank. This process removes about 80% of the phosphate contained in the raw sewage.

We claim:
1. An activated sludge sewage treatment process comprising mixing influent sewage material with sludge to provide a mixed liquor, aerating said mixed liquor for a time sufficient to reduce the BOD content and to cause the organisms present to take up phosphate and for not more than about eight hours, separating phosphate-enriched sludge from the mixed liquor to provide a substantially phosphate free effluent, treating said separated phosphate-enriched sludge by aerating for a time sufficient to reduce the phosphate content thereof and provide a phosphate enriched supernatant liquor, separating the sludge having a reduced phosphate content from said phosphate-enriched supernatant liquor, recycling said sludge having a reduced phosphate content and mixing with said influent sewage material.

2. An activated sludge sewage treatment process as defined in claim 1 wherein said phosphate-enriched sludge is contacted with said oxygen containing gas at a rate sufficient to reduce the amount of waste sludge to less than 50% of the amount which would have been produced if said phosphate-enriched sludge had not been contacted with said oxygen containing gas.

3. An activated sewage treatment process as defined in claim 1 wherein said mixed liquor is aerated at a rate sufficient to maintain at least 0.3 mg. of dissolved oxygen per liter of mixed liquor.

4. An activated sludge sewage treatment process as defined in claim 1 wherein said phosphate-enriched sludge is contacted with air at a rate of from about 2–20 cubic feet of air per gallon of sludge for from 3–24 hours.

References Cited

UNITED STATES PATENTS

| | | | |
|---|---|---|---|
| 3,236,766 | 2/1966 | Levin | 210—6 |
| 3,390,077 | 6/1968 | Forrest | 210—6 |

OTHER REFERENCES

Levin, G. V., et al.: Metabolic Uptake of Phosphorus, etc., Journal WPCF, June 1965, vol. 37, pp. 800–821 (P.O.S.L.).

Wells, W. N.: Differences in Phosphate Uptake, etc. Journal WPCF, vol. 41, May 1969, pp. 765–771 (P.O.S.L.).

MICHAEL ROGERS, Primary Examiner